United States Patent [19]

Nasky

[11] Patent Number: 4,785,900
[45] Date of Patent: Nov. 22, 1988

[54] VEHICLE COMPARTMENT CLOSURE ARRANGEMENT

[75] Inventor: Daniel J. Nasky, Concord, Ohio

[73] Assignee: Caterpillar Industrial Inc., Mentor, Ohio

[21] Appl. No.: 134,420

[22] Filed: Dec. 17, 1987

[51] Int. Cl.$^4$ .............................................. B62D 33/06
[52] U.S. Cl. .............................. 180/89.14; 180/69.21; 180/69.24; 296/97.23; 296/37.5
[58] Field of Search ................... 180/68.5, 69.2, 69.21, 180/69.24, 89.14, 328; 296/1 F, 37.5

[56] References Cited

U.S. PATENT DOCUMENTS

| | | | |
|---|---|---|---|
| 4,040,501 | 8/1977 | Haswell | 180/69.21 |
| 4,120,375 | 10/1978 | Shinoda et al. | 180/89.14 |
| 4,238,008 | 12/1980 | Higgins | 180/328 |
| 4,312,418 | 1/1982 | Rittman | 180/68.5 |
| 4,355,695 | 10/1982 | Leskovec | 180/69.21 |
| 4,359,121 | 11/1982 | Messner et al. | 180/69.21 |
| 4,362,220 | 12/1982 | Baston | 180/68.5 |
| 4,506,750 | 3/1985 | Leskovec | 180/69.21 |

*Primary Examiner*—Kenneth R. Rice
*Attorney, Agent, or Firm*—Alan J. Hickman

[57] ABSTRACT

A work vehicle having a frame defining a compartment for receiving vehicle components has a compartment closure arrangement which permits ease of access and adequate opening for servicing of the components. The compartment closure arrangement includes a cowl member which is pivotal in a first direction from a first position to a second position, a lid member which is pivotal in a second direction opposite the first direction from a first position to a second position, and a floor member which is pivotal between a first compartment covering position and a second compartment uncovering position. The compartment closure arrangement is particularly suited for use on a material handling vehicle.

15 Claims, 4 Drawing Sheets

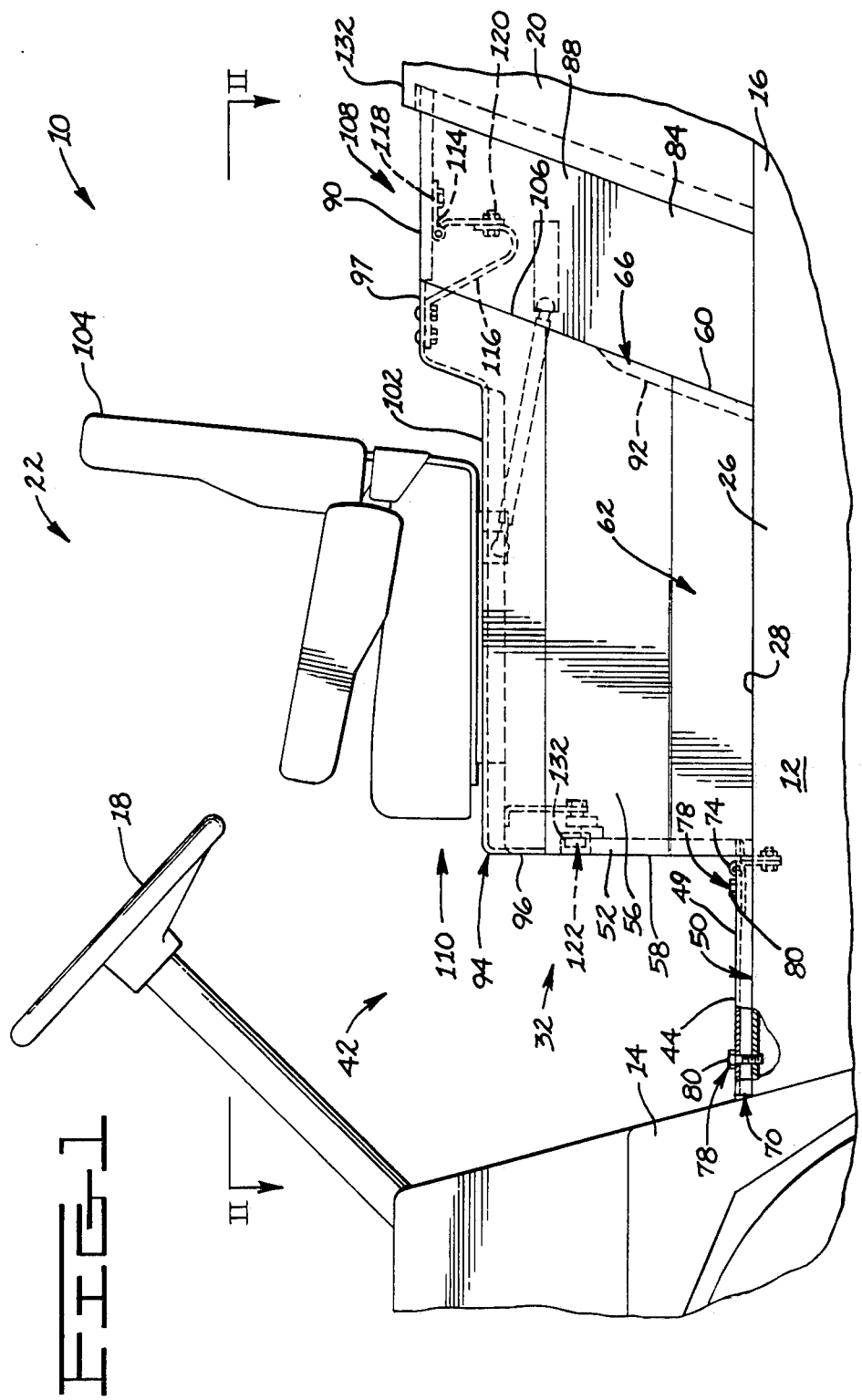

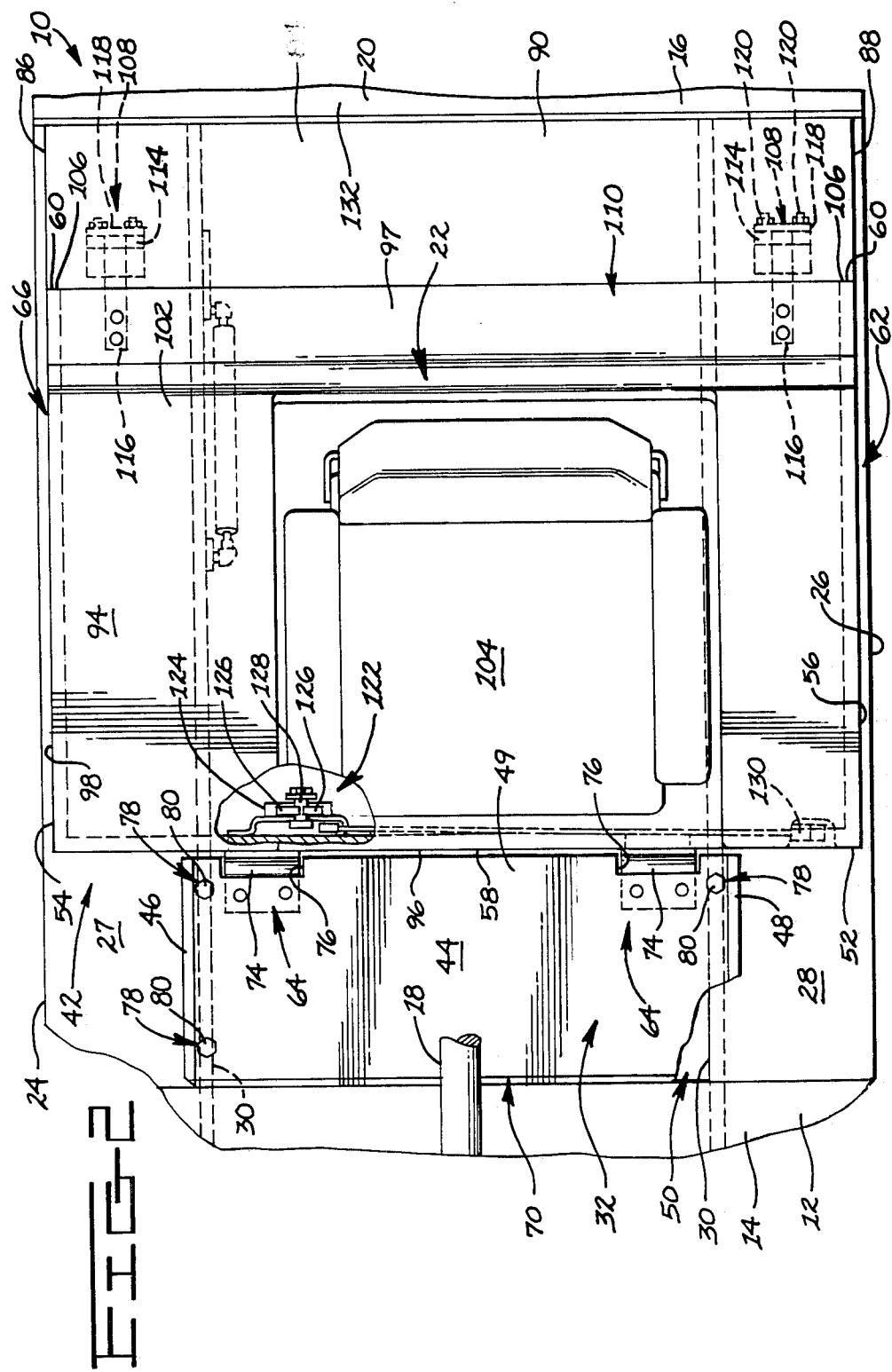

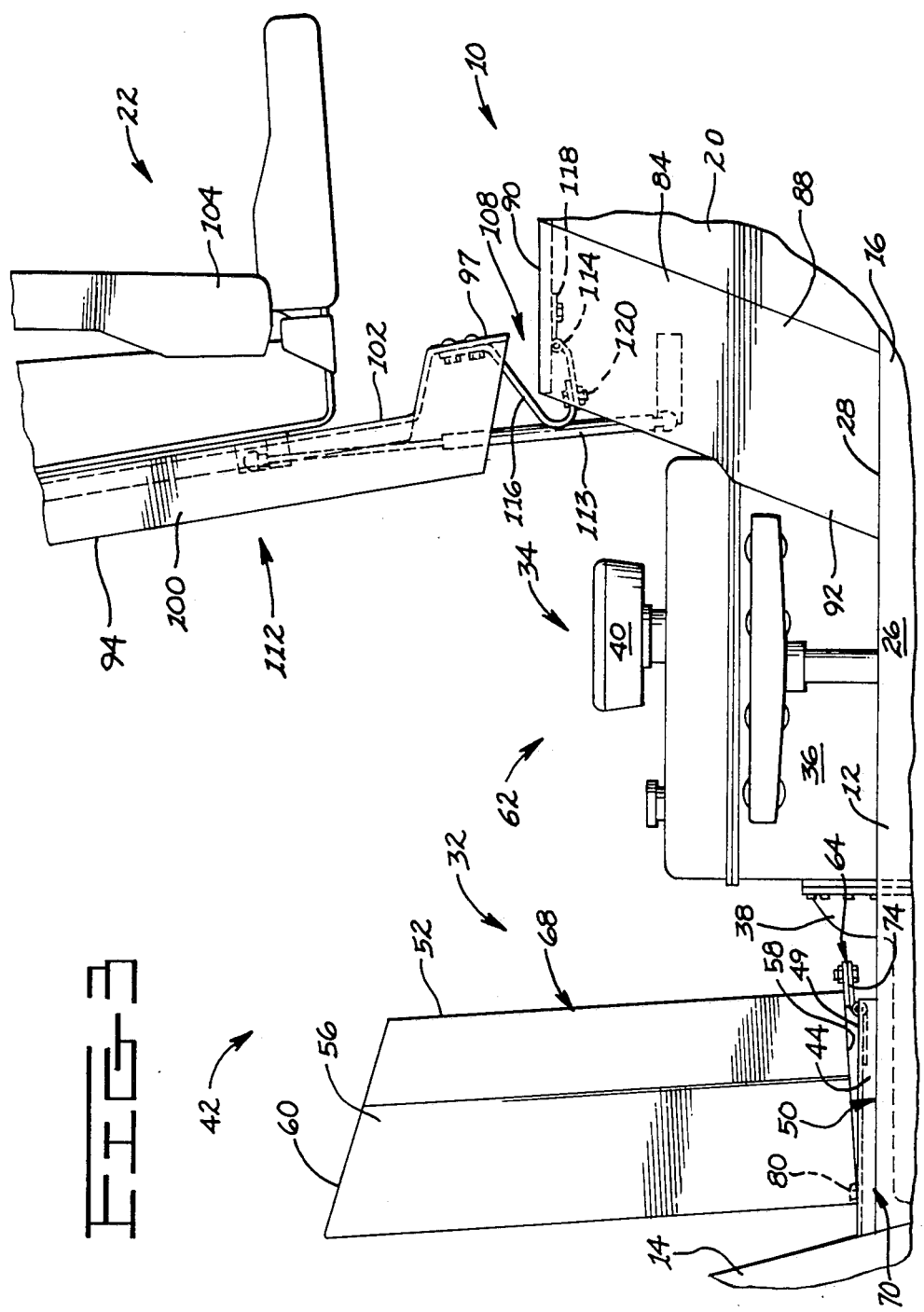

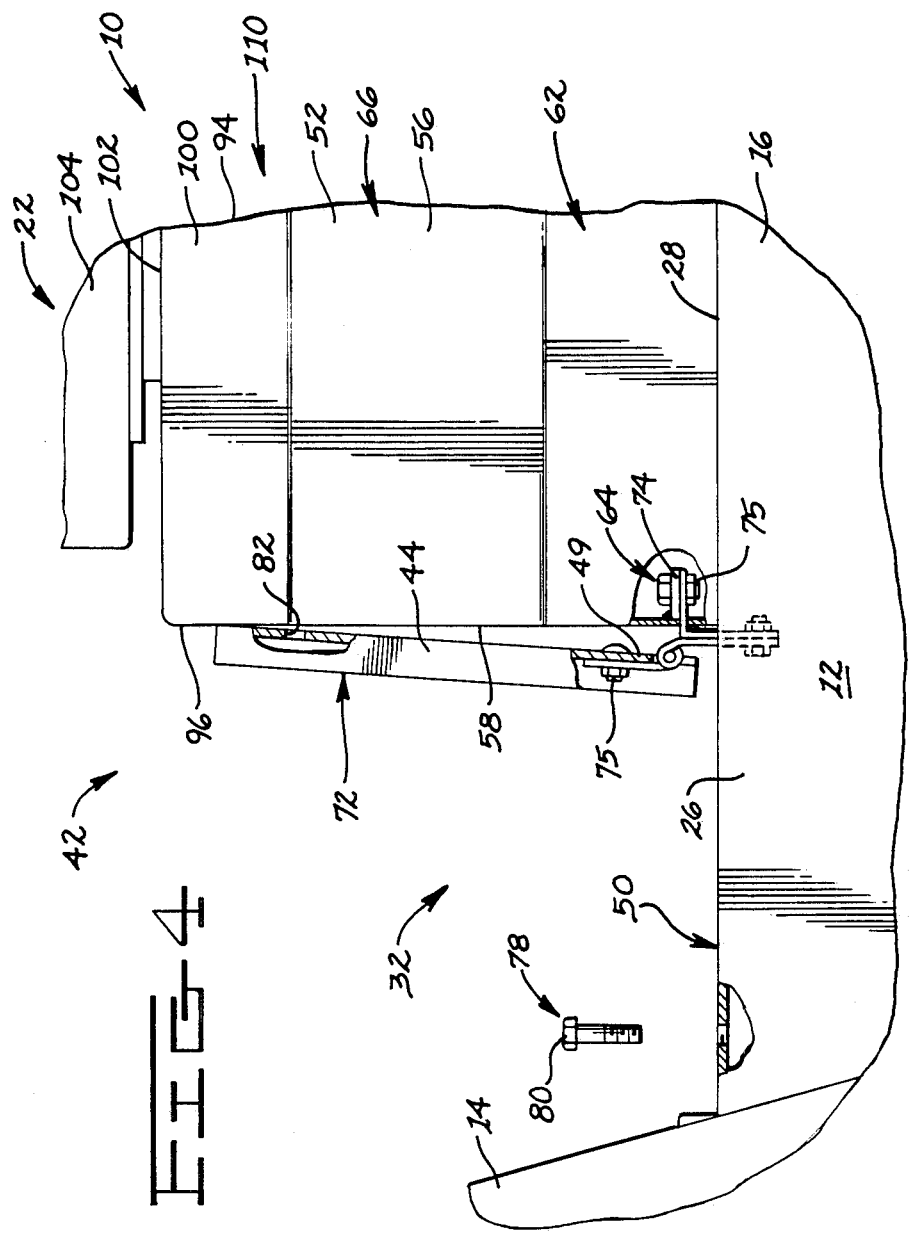

VEHICLE COMPARTMENT CLOSURE ARRANGEMENT

TECHNICAL FIELD

This invention relates to a vehicle compartment closure arrangement and more particularly to a vehicle having lid, shroud and a floor members which are each pivotable in selected directions for the purpose of providing access to a component compartment of the vehicle.

BACKGROUND ART

Work vehicles, such as, material handling vehicles, usually have a cover which is pivotally movable in a single direction (forward or rearward) to uncover a compartment defined by the vehicle frame. The cover typically has a plurality of sides and a top surface member which encloses the compartment and isolates the vehicle operator from noise, heat and the like which is generated, for example, by the vehicle engine, battery, hydraulic pumps and motors, filters, and electrical system components and the like housed within the cover and the compartment. The sides of the cover are normally long enough in length to extend from the top surface member to the frame of the vehicle when in a compartment covering position. Because of the substantial length of the cover sides, the cover is unable to pivot an adequate distance to totally free the sides of the cover from overlapping at least a portion of the compartment. The amount of pivoting permitted is limited by various portions of the vehicle such as, the counterweight, overhead guard, steering column, and seat mounted on the cover. As a result, access to certain ones of the various components of the vehicle is obstructed making servicing quite difficult and time consuming.

Other material handling vehicles have a cover which consists of a lid which is pivotally connected to the frame of the vehicle and a cowl which is rigidly affixed to the vehicle frame by threaded fasteners and the like. With the cowl in place and surrounding a portion of the compartment, certain components located within the compartment are not readily accessible. Therefore, the cowl or at least a portion thereof must be removed prior to any servicing of the difficult to access components. This of course requires additional time and effort on the part of a mechanic servicing the vehicle and reduces the overall productivity of the mechanic and vehicle.

Frequently the compartment defined by the vehicle frame extends beyond the confines of the hood and to a location beneath a floorboard of the vehicle. Additional vehicle components requiring servicing such as, transmissions, filters and the like are often located within this area of the compartment. In order to gain access to this area the vehicle must be either elevated for service from beneath or the floorboard must be removed and/or moved from covering the compartment. This of course takes additional time and may not provide adequate access to the compartment due to the cowl being located closely adjacent one end of the floor member. Also, portions of the frame which extend between the sides of the vehicle and to which the cowl and floorboard is attached reduces the size of the compartment opening and further limits accessibility.

Due to the complexity in construction of prior enclosures, especially those having multiple pieces, assembly and disassembly requires a substantial amount of time which results in additional downtime of the vehicle. As a result vehicle operator and mechanic time is wasted. Often the manufacturing tolerances of the parts of the enclosure and the assembly sequence of the parts of the enclosure makes it difficult to reassemble the enclosure as intended. This results in an improperly assembled compartment which detracts from the appearance and does not fit-up properly. Thus, the sound deadening and heat rejection properties of the enclosure is reduced which interferes with vehicle operator performance.

The present invention is directed to overcoming one or more of the problems as set forth above.

DISCLOSURE OF THE INVENTION

In one aspect of the present invention, a work vehicle having a frame defining a compartment and a floor member releasably connected to the frame and covering a first portion of the compartment is provided. A cowl member is pivotally connected to the floor member and pivotally movable in a first direction, from a first position, at which the cowl member is supportably engaged with the frame, to a second position, at which the cowl member is supported on the floor member and spaced from being supportably engaged with the frame. The floor member is pivotally movable relative to the cowl member between a first position, at which said floor member covers the first portion of the compartment, and a second position at which the floor member is spaced from covering the first portion of the compartment. The floor member is pivotally movable between the first and second positions subsequent to the floor member being released from connection with the frame. A supporting member is connected to the frame and a lid member is pivotally connected to the supporting member and pivotally movable in a second direction opposite the first direction, from a first position, at which the lid member covers the second portion of the compartment to a second position, at which the lid member is spaced from covering the compartment second portion.

BRIEF DESCRIPTION OF THE DRAWINGS

FIG. 1 is a diagrammatic partial side elevational view of an embodiment of the present invention showing a portion of a material handling vehicle with lid, cowl and floor members at a first position, at which the compartment is covered;

FIG. 2 is a diagrammatic partial top plan view taken along lines II—II of FIG. 1 with portions broken away to show a lid latching means;

FIG. 3 is a diagrammatic partial side elevational view of the material handling vehicle of FIG. 1 showing the lid and cowl members in a second position at which the compartment is uncovered; and FIG. 4 is a diagrammatic partial enlarged side elevational view of the material handling vehicle of FIG. 1 showing the floor member at a second position at which a first portion of the compartment is uncovered and the lid and cowl members are at the first position.

BEST MODE FOR CARRYING OUT THE INVENTION

With reference to the drawings, a work vehicle 10, such as a material handling vehicle of the type capable of picking up, transporting, and depositing a load is provided. The work vehicle 10 has a frame 12 and front and rear spaced apart end portions 14,16. A steering wheel 18 is rotatively mounted on the vehicle frame 12 at a location on the front end portion 14 of the vehicle and a counterweight 20 is mounted on the vehicle frame 12 at the rear end portion 16 of the vehicle. The steering wheel 18 and counterweight 20 are spaced from each other and define an operator station 22 therebetween.

As best seen in FIG. 2, the frame 12 has first and second spaced apart side portions 24,26 which are each constructed of steel plate to form channel like beams. The upper surface portions 27,28 of the first and second side portions 24,26, respectively, serves as a portion of the floor of the operator's station 22, and the inner sides 30 of the first and second spaced apart side portions 24,26 define the width of a compartment 32 located therebetween. Various vehicle components 34 such as, the vehicle engine 36, transmission 38, filters 40, and the like are at least partially disposed between the inner sides 30 of the compartment 32. It should be noted that the compartment 32 is located between the front and rear end portions 14 and 16 as well as between the inner sides 30 of the first and second side portions 24 and 26.

A compartment closure arrangement 42, as best seen in FIG. 4, includes a floor member 44 which is constructed of plate steel and has a rectangular configuration. The floor member 44 has first and second spaced apart sloped bent end portions 46,48 which engage the upper surface portions 27,28 of the first and second side portions 24,26, respectively, and a first end portion 49. The bent end portions 46,48 support the floor member 44 on the upper surface portions 27,28 at a first position 70 of the floor member 44 on the frame 12. The first position 70 is a location on the frame 12 at which the floor member 44 covers a first portion 50 of the compartment 32 located between the inner sides 30 and directly beneath the floor member 44.

As best seen in FIGS. 1–3, a cowl member 52, of the compartment closure arrangement 42, has first and second substantially parallel spaced apart sides 54,56 and a first end portion 58 connected to and between the first and second sides 54,56. The first end portion 58 of the cowl member 52 has a rectangular shape and the first and second side members 54,56 of the cowl member 52 each have an end 60 which is angled at an incline toward the front end portion 14 of the vehicle and in a downward direction toward the upper surface portions 27,28 of the frame 12. The cowl member 52 is positioned on the vehicle adjacent the floor member 44 and between the floor member 44 and the counterweight 20. The first side 54 of the cowl member 52 is supportably engaged with the upper surface portion 27 of the frame first side portion 24 and carried on the upper surface portion 27. Similarly, the second side 56 of the cowl member 52 is supportably engaged with the upper surface portion 28 of the second side portion 26 of the frame 12 and carried on the upper surface portion 28. It should be noted that the cowl member 52 partially surrounds various components 34 which are disposed in and extend from the compartment 32 and defines the boundaries of a second portion 62 of the compartment 32.

A means 64 is provided for pivotally connecting the first end portion 58 of the cowl member 52 to the floor member 44 and for maintaining the cowl member 52 for pivotal movement in a first direction from a first position 66 (FIG. 1), at which the cowl member 52 is supportably engaged with said frame first and second side portions 24,26, as previously discussed, to a second position 68 (FIG. 3), at which the cowl member 52 is supported on the floor member 44 and spaced from being supportably engaged with the upper surface portions 27,28. Similarly, the floor member 44 is pivotally movable about the pivotal connecting means 64 and relative to the cowl member 52 between a first position 70 (FIGS. 1 and 2), at which the floor member 44 covers the first portion 50 of the compartment 32 and is engaged with the upper surface portions 27,28 of the first and second side portions 24,26, as previously discussed, and a second position 72 (FIG. 4), at which the floor member 44 is spaced from the first position 70 and spaced from covering the first portion 50 of the compartment 32.

The pivotal connecting means 64 preferably includes a first pair of spaced apart hinge assemblies 74 which are fastened in any suitable manner, for example, by threaded fasteners 75, to the first end portion 58 of the cowl member 52 and to the first end portion 49 of the floor member 44. Cutouts 76 are provided in the floor for receiving a portion of each of the hinge assemblies of the first pair 74 in order to maintain the first end portion 58 of the cowl member 52 as close to the floor member 44 as possible. Therefore, the space between the first end portion 58 of the cowl member 52 and the floor member 44 is minimized and the potential for noise, heat, and the like from passing from the compartment 32 and to the operators station 22 is reduced.

Means 78 is provided for connecting the floor member 44 to the first and second side portions 24,26, of the frame 12 at the first position 70 of the floor member 44, and for releasing the floor member 44 from connection with the first and second frame side portions 24,26, and permitting pivotal movement of the floor member 44 between the first position 70 of the floor member 44, at which said floor member 44 covers the first compartment portion 50, and the second position 72 of the floor member 44, at which the floor member 44 is spaced from covering the first portion 50 of the compartment 32. The releasable connecting means 78 preferably includes a plurality of threaded fasteners 80 which are screwthreadably connected to the frame 12 and disposed in apertures 82 in the floor member 44. The releasable connecting means 78 is intended to include devices other than those previously described without departing from the spirit of the invention. These devices include locks, clasps, latches and other releasable fasteners which are known in the art.

A supporting member 84, which is located between the compartment 20 and the cowl member 52, has first and second spaced apart substantially parallel elongated sides 86,88 and a middle portion 90. The middle portion 90 is connected to and between the first and second sides 86,88. The first and second sides 86,88 are connected to the first and second frame side portions 24,26, respectively, and extend therefrom in an elevationally upward direction and at a preselected angle of inclination toward the counterweight 20. The angle of inclination of the first and second sides 86,88 of the supporting member 84 is substantially the same as the angle of inclination of the inclined end 60 of the cowl first and second sides 54,56. The first and second sides 86,88 each have a forwardly projecting portion 92 which serves as a stop for the first and second sides 54,56 of the cowl member 52. With the cowl member 52 in the first position 66, the cowl first and second sides 86,88 overlap the forward projecting portions 92 of the cowl first and second sides, respectively. This prevents movement of the first and second sides 86,88 in a direction inwardly relative to the vehicle 10 and towards the compartment 32.

The compartment closure arrangement 42 includes a lid member 94 having a first and second spaced apart end portions 96,97 first and second spaced apart substantially parallel side portions 98, 100, and a top portion 102 upon which an operator's seat 104 is mounted. The first end portion 96 of the lid member 94 is connected to the first and second side portions 98,100 of the lid member 94, and the top portion 102 of the lid member 94 is connected to the first end portion 96 and the first and second side portions 98 and 100 of the lid member 94. It should be noted that the lid member 92 first and second side portions 98,100 each have an inclined end 106 which is inclined in the same direction and at substantially the same angle as the first and second sides 54,56 of the cowl member 52.

Means 108 is provided for pivotally connecting the second end portion 97 of the lid member 94 to the middle portion 90 of the supporting member 84 and for maintaining the lid member 94 for pivotal movement in a second direction, opposite the first direction of pivotal movement of the cowl member 52, from a first position 110 (FIG. 1), at which the lid member 94 covers the second portion 62 of the compartment 32, to a second position 112 (FIG. 3), at which the lid member 94 is spaced from covering the compartment 32 and overlies at least a portion of the supporting member 84. A gas spring 113, of a conventional construction, holds the lid member 94 in the second position and allows for selective forceable movement of the lid member 94 between the first and second positions 110, 112. The lid member 94 is engaged with the cowl member 52 at the first position of the lid and cowl members 94,52. In particular, the lid member 94 first end portion 96 and first and second side portions 98,100 are engaged with the first end portion 58 and first and second sides 54,56, respectively, of the cowl member 52 at the first position 110, of the lid and cowl members 94,52. Thus, the weight of the lid member 94 and operators seat 104 is supported on the cowl member 52 at the cowl and lid first positions 66, 110.

The pivotal connecting means 108 of the lid member 94 preferably includes a second pair of spaced apart hinge assemblies 114 which are connected at spaced apart locations to the top portion 102 of the lid member 94 and at spaced apart locations on the middle portion 90 of the supporting member 94. Each of the hinge assemblies of the second pair 114 include a first bracket portion 116 connected to the top portion 102 in any suitable manner, such as by fasteners, and a second bracket portion 118 connected to the middle portion 90 in any suitable manner, such as by fasteners. The first bracket portion 116 consists of two members which are slidably movable relative to each other and connected together by threaded fasteners 120. This permits the lid member 94 to be adjusted so that it fits squarely on the cowl member 52 and squarely abuts the supporting member 84 at the lid first position 110 of the lid member.

Means 122 is provided for releasably connecting the first end portion 96 of the lid member 94 to the first end portion 58 of the cowl member 52 and maintaining the lid and cowl members 94,52 at their first positions 66, 110 (FIG. 1). Because the cowl and lid members 52,94, pivot in opposite directions to uncover the compartment, the lid member 94, and the weight thereof bearing upon the cowl member 52, will resist inadvertent pivotal movement of the cowl member 52 from the first position 66 towards the second position 68 without the assistance of the latching means 122 in most circumstances. The latching means 122 is primarily provided for maintaining the lid member 94 at the first position 110 and from inadvertent movement. The latching means 122 provides for selective release of the lid member 94 from connection to the cowl member 52 so that the lid and cowl members 94,52 can be pivoted to their second positions 112,68 for servicing of the components 34 positioned at the second portion 62 of the compartment 32. The releasable latching means 122, as seen in FIGS. 1 and 2, includes a latching mechanism 124 having a pair of pivotal detented claws 126 which are mounted on the cowl first end portion 58 and a latch pin 128 connected to the lid member 94 at a location adjacent the first end portion 96. The claws 126 are selectively movable by a pull cable assembly 130 from a detented closed position to a detented open position. The latch pin 128 engages the claws 126 during closure of the lid member 94 and forces the claws 126 from its open position, at which the latch pin 128 is free to move, to its closed position, at which the latch pin is captured by the claws 126. Therefore, movement of the lid member 94 from the second position 112 to the first position will result in the claws 126 being moved to the closed position and the lid 94 being latchably connected to the cowl member 52.

The counterweight 20 has an annular lip 132 which extends from the counterweight in a direction towards the supporting member 84 and overlaps a portion of the first and second sides 86,88 and middle portion 90 of the supporting member 84. A preselected amount of clearance is provided between the supporting member 84 and the lip 132 to allow for manufacturing tolerances and provide a small amount of relative motion between the counterweight 20 and the supporting member 84. The overlap between the supporting member 84 and the lip 132 of the counterweight acts as a baffle and reduces the potential for noise and the like from passing from the compartment 32 to the operators station 22.

Industrial Applicability

The material handling vehicle 10, as shown in FIGS. 1 and 2, is in the operational condition and ready to lift, lower, and transport loads between locations within the facility in which it operates. In this condition the floor, cowl, and lid members 44,52,94 of the compartment closure arrangement 42 are at their first compartment covering positions 70,62, and 110, and noise, heat, dust, and the like within the compartment 32 is blocked from the operators station 22.

In order to service the vehicle 10, and particularly the components 34 located within the compartment 32, the mechanic determines which of the first and second portions 50,62 of the compartment 32 he wishes to access and simply releases the appropriate ones of the lid cowl and floor members 94,52,44. To completely uncover the second portion 62 of the compartment 32 the mechanic first releases the latching mechanism 124 by pulling the pull cable assembly 132 and pivots the lid member 94 in the second direction, from the first position 110 to the second position 112, and the cowl member 52, in the first direction, from the first position 66 to the second position 68. To uncover the first portion 62 of the compartment 32, the mechanic releases the floor member 42 from connection with the frame 12 by removing the fasteners 80 and pivots the floor member 44, in the first direction, from the first position 70 of the floor member 44 to the second position 72 of the floor member 44.

If the mechanic desires to expose the entire compartment (the first and second portions 50,62) for reasons such as, major and/or complete servicing, the floor and cowl members 42,52 may be removed as a unit by simply removing the threaded fasteners 80, unlatching the lid member 94 from the cowl member 52, and pivoting the lid member to the second position 112.

In some instances the mechanic may only require that the lid member 94 be raised from the first position 110 to the second position 112. This will afford him access to the upper area of the second portion 62 of the compartment 32. For example, he would be able to check the engine oil level, cooling system coolant level, and battery fluid level with only the lid member 94 in the second position 112.

With the lid member 94 in the second position 112 and the cowl member 52 in its second position 68, as shown in FIG. 3, the components 34 located in the second portion 62 of the compartment 32 are fully and readily accessible for servicing. Similarly, with the floor member 44 in its second position 72, those components 34 requiring service in the first portion 50 of the compartment 32 are easily accessible. Due to the ease of preparing vehicles for servicing and/or operation, substantial time will be saved making it possible for the mechanics to service additional vehicles and reduce the overall down time of each of the vehicles serviced.

Since means 64 pivotally connects the cowl member 52 directly to the floor 44 and not to the vehicle frame 12 the need for providing structural gussets, connecting flanges, and the like is eliminated. This enables the first and second portions 50,62 of the compartment 32 to be open to each other and provides for obstruction free access to the first and second portions 50,62 of the compartment 32. Because the floor member 44 serves as an anchor for the cowl member 52 when fastened to the frame 12 by the releasable connecting means 78 the number of parts required is kept to a minimum and the construction is simplified. Also, since the floor, lid and cowl members 44,94,52 are pivotal the problems associated with fit-up, such as, discussed with respect to individually removable parts has been reduced.

Other aspects, objects, and advantages of the present invention can be obtained from a study of the drawings, the disclosure and the appended claims.

I claim:

1. A work vehicle having a frame, said frame having first and second spaced apart side portions defining a compartment therebetween, comprising:

a floor member releasably connected to said frame and covering a first portion of the compartment;

a cowl member pivotally connected to said floor member and pivotally movable in a first direction from a first position, at which said cowl member is supportably engaged with said frame and defines boundaries of a second portion of said compartment, to a second position, at which said cowl member is supported on said floor member and spaced from being supportably engaged with said frame, said floor member being pivotally movable relative to said cowl member between a first position, at which said floor member covers the first portion of the compartment, and a second position, at which the floor member is spaced from covering the first portion of the compartment, said floor member being pivotally movable between said first and second positions subsequent to said floor member being released from connection with said frame;

a supporting member connected to the frame; and a lid member pivotally connected to said supporting member and pivotally movable in a second direction opposite said first direction, from a first position, at which said lid member covers said second portion of said compartment, to a second position, at which said lid member is spaced from covering the second portion of said compartment.

2. A work vehicle, as set forth in claim 1, wherein said lid member engages said cowl member at the first position of the lid and cowl members and maintains said cowl member from pivotal movement between said cowl member first and second positions.

3. A work vehicle, as set forth in claim 2, wherein said cowl and lid members each have a first end portion and including means for releasably latching the first end portion of the lid member to the cowl member.

4. A work vehicle, as set forth in claim 1, wherein said cowl member is disposed between the floor member and the supporting member at the first position of the cowl member and pivotally moves toward said floor member during pivotal movement in the first direction of the cowl member.

5. A work vehicle, as set forth in claim 4, wherein said first and second frame side portions each include an upper surface portion, said floor and lid members each engage at least one of the upper surface portions of said frame side portions at the first position of the floor and lid members.

6. A work vehicle, as set forth in claim, 5 wherein said floor member has a first end portion and said lid member has a second end portion spaced from said first end portion, said floor and cowl members being pivotally connected to each other at said floor and cowl member first end portions by a first pair of spaced apart hinge assemblies, and said lid second end portion being pivotally connected to said supporting member by a second pair of spaced apart hinge assemblies.

7. A work vehicle, as set forth in claim 1, wherein said cowl member has first and second spaced apart substantially parallel sides and a first end portion connected to and between said first and second spaced apart sides, said supporting member having first and second spaced apart substantially parallel sides and a middle portion connected to and between the first and second supporting member sides, said first side of the cowl member overlapping a forwardly projecting portion of the first side of the supporting member, at the first position of the cowl member, and said second side of the cowl member overlapping a forwardly projecting portion of the second side of the supporting member, at the first position of the cowl member.

8. A material handling vehicle, having a frame and an operators station, said frame having first and second spaced apart side portions defining a compartment therebetween and said operators station having a lid member and an operators seat mounted on the lid member, comprising:

a floor member located at a first position at which said floor member covers a first portion of the compartment;

a cowl member having first and second spaced apart sides and a first end portion connected to and between the first and second sides;

means for pivotally connecting the cowl first end portion to the floor member and maintaining said cowl member for pivotal movement in a first direction, from a first position, at which said cowl member is supportably engaged with said frame first and second side portions, to a second position, at which said cowl member is supported on said floor member and spaced from being supportably engaged with said frame, said cowl member defining the boundaries of a second portion of the compartment;

means for connecting the floor member to the frame first and second side portions, at the first position of said floor member, and for releasing the floor member from connection with the first and second side members and permitting pivotal movement of the floor member between said first position and a second position at which said floor member is spaced from covering the first portion of said compartment;

a supporting member having first and second spaced apart sides and a middle portion connected to and between the first and second sides of the supporting member, said first and second sides of the supporting member being connected to the first and second side portions of the frame; and means for pivotally connecting the lid member to the middle portion of the supporting member and maintaining said lid member for pivotal movement in a second direction opposite said first direction, from a first position, at which said lid member covers the second portion of the compartment, to a second position, at which said lid member is spaced from covering said second portion of the compartment.

9. A material handling vehicle, as set forth in claim 8, wherein said lid member is supported on the cowl member at the first position of the lid and cowl members.

10. A material handling vehicle, as set forth in claim 9, wherein said means for pivotally connecting the cowl first end portion to the floor member includes a first pair of hinge assemblies, and said means for pivotally connecting the lid member to the middle portion of the supporting member includes a second pair of hinge assemblies.

11. A material handling vehicle, as set forth in claim 9, wherein the first and second spaced apart sides of the cowl member overlap a forwardly projecting portion of the first and second sides, respectively, of the supporting member at the first position of the cowl member.

12. A material handling vehicle, as set forth in claim 8, wherein said lid and cowl members are disposed between the floor and supporting members at the first position of the lid and cowl members.

13. A material handling vehicle, as set forth in claim 12, wherein said lid member overlies at least a portion of the supporting member at the second position of the lid member, and said cowl member overlies at least a portion of said floor member at the second position of the cowl member.

14. A material handling vehicle, as set forth in claim 8, wherein said means for connecting the floor member to the frame first and second sides includes a plurality of threaded fasteners screwthreadably connected to the frame and disposed in apertures in said floor member.

15. A material handling vehicle, as set forth in claim 9, wherein said lid member has a first end portion and including latching means for releasably connecting the first end portion of the lid to the first end portion of the cowl member at the first position of the lid and cowl members.

* * * * *